United States Patent [19]
Mulvaney, III et al.

[11] Patent Number: 6,086,652
[45] Date of Patent: Jul. 11, 2000

[54] METHOD AND APPARATUS FOR INITIAL PURIFICATION OF LIQUID METAL HEAT EXCHANGE FLUID

[75] Inventors: Robert C. Mulvaney, III, Arlington Heights; Stephen A. McColl, Des Plaines, both of Ill.

[73] Assignee: UOP LLC, Des Plaines, Ill.

[21] Appl. No.: 09/222,112

[22] Filed: Dec. 29, 1998

[51] Int. Cl.$^7$ ................................................ C22B 9/02
[52] U.S. Cl. ........................... 75/407; 75/589; 75/406; 75/408; 266/227; 376/312; 376/313
[58] Field of Search ............................. 75/407, 406, 408, 75/589; 376/312, 313; 266/227

[56] References Cited

U.S. PATENT DOCUMENTS

| | | | |
|---|---|---|---|
| 3,873,447 | 3/1975 | Pohl | 210/179 |
| 3,941,586 | 3/1976 | McKee, Jr. | 75/66 |
| 4,549,032 | 10/1985 | Moeller et al. | 585/445 |
| 4,830,816 | 5/1989 | Grundy | 376/313 |
| 4,892,653 | 1/1990 | Latge | 210/184 |
| 4,928,497 | 5/1990 | Large | 62/55.5 |
| 5,030,411 | 7/1991 | Cooper | 376/312 |
| 5,130,106 | 7/1992 | Koves et al. | 422/216 |
| 5,405,586 | 4/1995 | Koves | 422/218 |
| 5,525,311 | 6/1996 | Girod et al. | 422/200 |

FOREIGN PATENT DOCUMENTS

| | | |
|---|---|---|
| 2028297 | 6/1970 | Germany . |
| 2170898 | 10/1985 | United Kingdom . |

*Primary Examiner*—Melvyn Andrews
*Attorney, Agent, or Firm*—John G. Tolomei

[57] ABSTRACT

A method for removing oxides from a liquid metal heat exchange fluid following the initial startup of the heat exchange system fixes oxygen by locating an oxygen scavenging material in a drain tank. During initial fabrication and periods of maintenance metal surfaces of the conduits, heat exchange elements and other equipment become coated with an oxide layer. This invention eliminates the need for the sacrificial traps in the circulating system that are used to remove this initial oxide loading by placing an oxygen scavenging material in the drain tank. The drain tank is ordinarily provided to retain the inventory of liquid metal when it is not circulating in the heat exchange volume. A simple drain down of the liquid metal inventory can thereby remove from the liquid metal inventory essentially all of the oxide impurities that usually accompany an initial startup of such a system. As a result traps or other elements that were needed for this initial clean-up are unnecessary in the main circulation volume of the liquid metal.

11 Claims, 1 Drawing Sheet

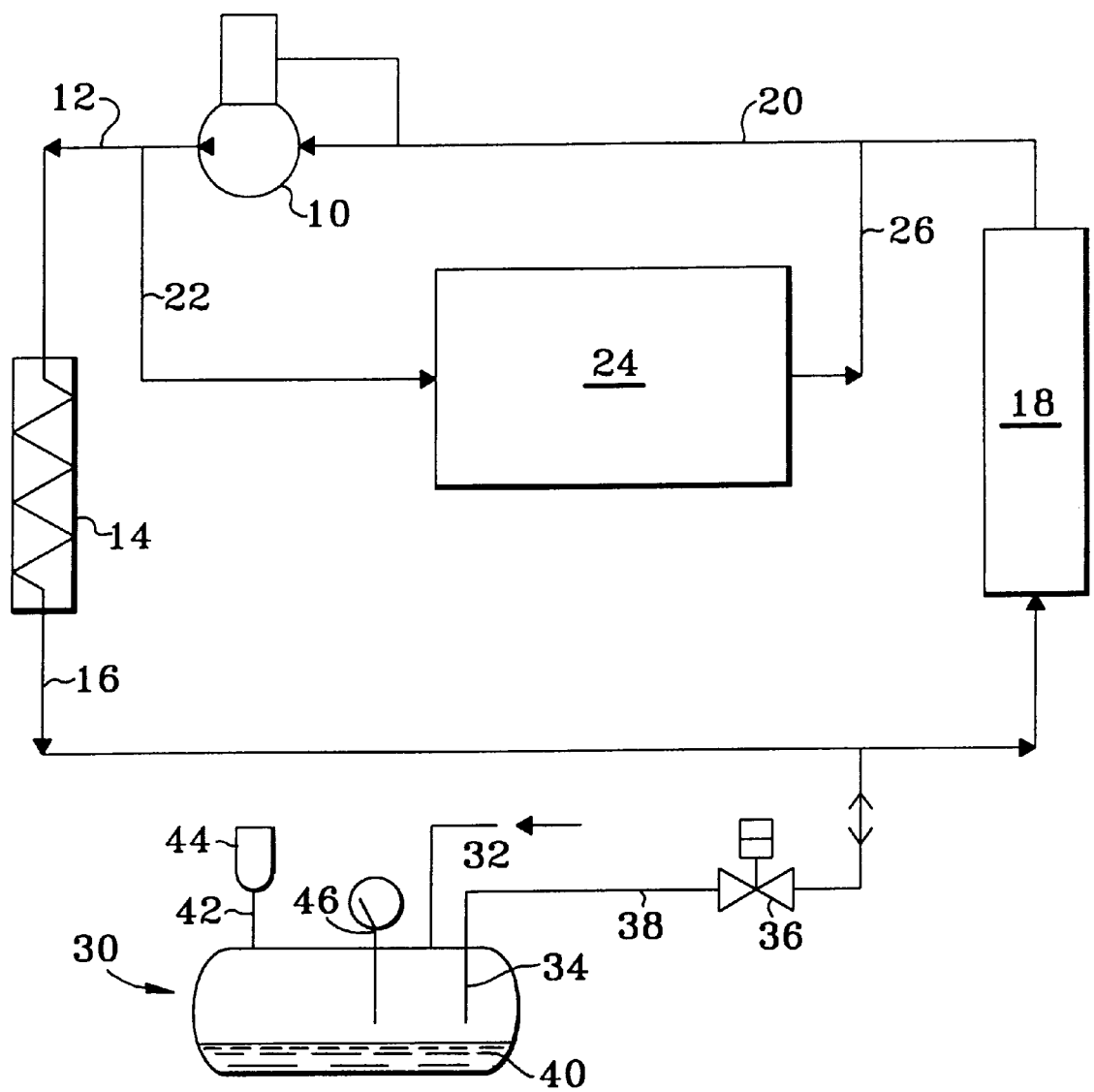

METHOD AND APPARATUS FOR INITIAL PURIFICATION OF LIQUID METAL HEAT EXCHANGE FLUID

FIELD OF THE INVENTION

This invention relates to the use of liquid metals as an indirect heat exchange fluid to indirectly heat or cool fluids and specifically to the removal of impurities from such streams.

BACKGROUND OF THE INVENTION

High heat capacity heat transfer fluids are used in several industries to provide cooling for shell and tube heat exchanger arrangements. Various types of high heat capacity fluids include alkali liquid metals such as sodium, lithium, and potassium and include molten salts such as nitrates and carbonates. These heat transfer fluids combine high heat capacity with high thermal conductivity. British patent 2170898 generally discloses the use of sodium as a heat transfer medium in high temperature reactions including heat recovery from furnace installations, high pressure nuclear reactors, coal gasification, coal conversion, and water disassociation. U.S. Pat. No. 4,549,032 discloses the use of molten salt as an indirect heat transfer medium with a dehydration of styrene. German patent DE 2028297 discloses the use of an alkaline metal as a heat transfer medium in a process for producing alkenes and aromatics by cracking aliphatic hydrocarbons. The liquid metals are specifically used due to their high heat transfer capacity that permits utilization of small heating surfaces.

Liquid metals are receiving more attention in many industries, like the petrochemical and chemical industries, where contact of reaction fluids with a catalyst in a reactor under suitable temperature and pressure conditions effects a reaction between the components of one or more reactants in the fluids. Most of these reactions generate or absorb heat to various extents and are, therefore, exothermic or endothermic. The heating or chilling effects associated with exothermic or endothermic reactions can positively or negatively affect the operation of the reaction zone. The negative effects can include among other things: poor product production, deactivation of the catalyst, production of unwanted by-products and, in extreme cases, damage to the reaction vessel and associated piping. More typically, the undesired effects associated with temperature changes will reduce the selectivity or yield of products from the reaction zone. Indirect heat exchange to maintain an isothermal or other temperature profile within the reaction zone can be particularly effective. It is known to accomplish indirect heat exchange for processes with a variety of heat exchanger configurations including shell and tube heat exchange designs or thin plates that define reaction and heat exchange channels. In such arrangements the tubes typically contain catalyst while the channels contain a heat exchange fluid or in a plate arrangement the channels alternately retain catalyst and reactants in one set of channels and a heat transfer fluid in adjacent channels. A specific arrangement for heat transfer and reactant channels that offers more complete temperature control can again be found in U.S. Pat. No. 5,525,311; the contents of which are hereby incorporated by reference. Other useful plate arrangements for indirect heat transfer are disclosed in U.S. Pat. No. 5,130,106 and U.S. Pat. No. 5,405,586.

These different types of heat exchange arrangement can benefit from the use of liquid metal heat transfer fluids that are circulated in a closed heat transfer loop. During the initial fabrication and at subsequent times when the heat exchange loop is opened to the atmosphere for maintenance an oxide layer can form on the metallic heat exchange surfaces. The liquid metal removes this oxide layer from the heat exchange surfaces thereby introducing oxides into circulating liquid metal. These oxides and other deposits that accumulate during startup and maintenance, sometimes referred to as the dirt burden, need to be removed to prevent precipitation of the impurities from the circulating liquid metal stream. Should the metal oxide or other impurity concentration exceed solubility limits, the precipitation of solids can interfere with the operation of the process or cause damage to equipment.

The need to efficiently and effectively deal with this dirt burden increases as more efficient and expanded heat transfer surfaces are employed. The trend in heat exchange arrangements for hydrocarbon conversion processes is to raise heat exchange efficiency by increasing the surface area for the indirect heat through the use of a series of thin stacked plates. This approach maximizes surface area, but as the area of the heat exchange surface increases so do the sites for initial oxidation which adds to the initial dirt burden and complicates its removal.

Those skilled in the art of using liquid metals as indirect heat exchange materials have addressed the problem of eliminating impurities, in particular, oxides and hydrides from the liquid metal streams. Two methods are routinely used, alone or in combination, to remove such impurities. One method removes impurities by precipitation and filtration or collection of the impurities in a cold trap. The typical apparatus associated with a cold trap comprises an economizer exchanger that transfers heat between hot, unpurified metal and the cold purified metal, a cooler for the liquid metal, and some form of retainer for a filtering element. U.S. Pat. No. 4,928,497; U.S. Pat. No. 3,873,447 and U.S. Pat. No. 4,892,653 disclose different designs for cold traps and methods for their operation. U.S. Pat. No. 3,941,586 teaches the purification of cold trap by heating sodium hydride to a molten state and removing or venting hydrogen gas from the cold trap and also describes the presence of a drain tank. Most systems for the circulation of a liquid sodium heat transfer fluid include a dump or drain tank that can hold the circulating inventory of liquid sodium when the system is shut down.

The other method of removing impurities chemically reacts the impurities with a chemisorbent or getter material that acts a scavenger to chemically bind an impurity or a substituent of the impurity to a fixed substrate that retains the reactive moiety of the getter. U.S. Pat. No. 4,830,816 discloses a getter type trap for removal of oxides from liquid metals. Suitable oxide getters use well known oxygen scavenging material such as zirconium, calcium, or titanium. Ordinarily the getter material is also retained in a dedicated trap that physically binds a mesh or gauze material made up of the getter material.

Managing the large dirt burden routinely calls for the use of such traps in a sacrificial manner somewhere in the flow path of the circulating heat transfer fluid. The trap will reach its sorption capacity shortly after the startup of the system and becomes useless thereafter. Once the impurity is chemically bound there is no need to continue passing the entire inventory through the getter material. Such passage raises pressure drop and needlessly expands the piping in the circulation loop. It is therefore advantageous to remove the trap from the system after its initial use and helpful to replace the trap to retain a capacity for oxide removal. Replacement of cold traps and getter material is costly and inconvenient.

Therefore, it is particularly desirable to have a process that can simply and effectively handle a high dirt burden. Accordingly it is an object of this invention to improve methods for removing the dirt burden of oxides and other materials from a circulating liquid metal heat exchange fluid. It is a further object of this invention to eliminate the need for removing and replacing in line oxide traps from a system for circulating a liquid metal heat transfer fluid.

BRIEF SUMMARY OF THE INVENTION

This invention is a method for removing oxides from a liquid metal heat exchange fluid following the initial startup of the heat exchange system that fixes oxygen from the oxide layer in an oxygen scavenging material located in a drain tank. This invention eliminates the need for the sacrificial traps in the circulating system to remove the oxide layer from the metal surfaces of the conduits, heat exchange elements and other equipment that forms when the system is open to the atmosphere during initial fabrication and periods of maintenance. Placing the oxygen scavenging material in a drain tank provides a large volume for providing surplus oxygen scavenging material in a location removed from the normal circulation path of the liquid metal. Since the drain tank is ordinarily provided to retain the inventory of liquid metal when it is not circulating in the heat exchange volume, no extra equipment is needed. A simple drain down of the liquid metal inventory using equipment that is already provided can thereby remove from the liquid metal inventory essentially all of the oxide impurities that usually accompany an initial startup of such a system. As a result traps or other elements that were needed for this initial clean-up are now removed from the main circulation volume of the liquid metal.

The method requires the initial removal of the oxide compounds from the surfaces of the circulation volume in which the liquid circulates for removal in the drain tank. The heat exchange fluid should circulate in the heat exchange volume for a sufficient time to transfer a desired amount of oxygen from the oxide layer into the heat exchange fluid. Circulation of the liquid metal in the heat exchange volume at a temperature of at least 300° C. for a period of as little as one hour and more preferably a period of at least 4 hours can remove a substantial amount of the oxide layer. Increasing the temperature of the circulating liquid metal and/or the circulation time of the liquid metal will guarantee a more complete removal of oxide from the heat exchange volume. For the typical commercial operation, circulating the liquid metal in the heat exchange volume at a temperature of 400° C. for a period of 8 hours will transfer essentially all oxygen from the oxide layer into the heat exchange fluid.

Preferably all of the inventory of the liquid metal will then enter the drain tank for removal of the oxygen and oxides by the oxygen scavenging material. The residence time and conditions in the drain tank should promote the essentially complete removal of oxygen by the oxygen scavenging material. For a typical system configuration, the liquid metal inventory should reside in the tank for at least 1 hours, preferably at least 2 hours, and more preferably at least 4 hours at a temperature of at least 200° C., preferably at a temperature of at least 300° C., and more preferably at a temperature of at least 400° C. The necessary residence time will of course vary with the temperature of the drain tank, the amount of oxygen and the type and amount scavenging material in the drain tank, and the effectiveness of the contact between the liquid metal and the oxygen scavenging material. For very high oxide loadings, an elevated temperature may be at least temporarily maintained in the drain tank to prevent precipitation of solid oxide before reaction of the oxygen with the scavenging material. Again where oxide loading are very high, precipitation may be avoided by removing the oxide layer from the surfaces of the circulating volume with a series of fill, circulation, and drain steps that remove only portion of the oxides at any one time.

The drain tank can conveniently retain a quantity of oxygen scavenging material that can accommodate multiple startups that follow exposure of the heat exchange surfaces to oxide forming conditions. The volume of the drain tank ordinarily must accommodate the entire inventory of the liquid metal. The addition of the oxygen scavenging material imposes a relatively minor incremental change in its volume. The amount of oxygen scavenging material located in the drain tank will be largely a function of the metal surface area and the surface area of the scavenging material. In general enough scavenging material will usually be needed to chemically bind about 1200 grams of oxide from the heat transfer fluid per square meter wetted by the heat transfer fluid (2.5 lbs/1000 ft$^2$ of wetted surface). In the case of a calcium scavenging material, this level of oxide loading on the heat exchange surface would require about 1 kg of Ca per square meter of wetted surface (2 lbs Ca/1000 ft$^2$ of wetted surface). Although usually not necessary in view of the large available tank volume, suitable openings may be provided for removal and replacement of the material while the tank is isolated from the rest of the heat exchange system.

Any material that is compatible with heat exchange fluid, that has a large capacity for chemically reacting oxygen from the heat exchange fluid, and that has a from that will keep it in the drain tank can serve as the oxygen scavenging material. Scavenging materials of particular interest to this invention include zirconium, titanium and calcium. Zirconium and titanium metals can be formed into a gauze or a mesh that provides a large surface area and will hold a structural shape that retains it in the drain tank. Any of the scavengers can also be dispersed on a suitable support. A preferred support and scavenger combination is a calcium scavenger dispersed on an alumina support.

Accordingly in one embodiment this invention is a method for the startup purification of a circulating heat exchange stream comprising a liquid metal heat exchange fluid. The method charges a heat transfer fluid comprising a liquid metal into initial contact with the metallic surfaces defining a fluid circulation volume for indirect heat exchange. At least a portion of the surfaces have been exposed to oxidation conditions. The heat transfer fluid passes through the circulation volume at suitable conditions to remove oxides from the metallic surfaces and introduce oxides into the liquid metal. The liquid metal drains into a drain tank for the retention of the liquid metal. In the drain tank the liquid metal contacts an oxygen scavenging material at suitable conditions to reduce the concentration of the oxides. The liquid metal having a reduced oxide concentration is returned from the drain tank to the circulation volume.

In another embodiment this invention comprises a system for the circulation of a liquid metal heat exchange stream that provides purification of the heat exchange stream after initial startup. The system includes a circulation volume defined at least in part by heat exchange surfaces and conduits for circulating a liquid metal between heat addition and heat removal locations and a drain tank in communication with the circulation volume. The drain tank is sized to retain the entire inventory of liquid metal from the circulation volume. The drain tank also holds an oxygen scavenging material for contacting the liquid metal and chemically absorbing oxygen from the liquid metal.

BRIEF DESCRIPTION OF THE DRAWING

The FIGURE is a schematic flow diagram of an arrangement of the invention.

DETAILED DESCRIPTION OF THE PREFERRED EMBODIMENT

Suitable heat exchange fluids comprise metals that maintain a liquid state at the desired heat exchange conditions of the process. Preferably, the molten metal is selected from the group consisting of sodium, potassium, lithium, lead, antimony, bismuth, and mixtures thereof. Mixtures of the above metals may form particularly useful eutectic mixtures.

The method may be useful in a wide variety of catalytic processes that use homogeneous or heterogeneous catalysts. This invention is most beneficially applied to catalytic conversion processes having high heats of reaction. Typical reactions of this type are hydrocarbon conversion reactions that include: the aromatization of hydrocarbons, the reforming of hydrocarbons, the dehydrogenation of hydrocarbons, and the alkylation of hydrocarbons. More specific hydrocarbon conversion processes to which this invention are suited include: catalytic dehydrogenation of paraffins, reforming of naphtha feedstreams, aromatization of light hydrocarbons, and the alkylation of aromatic hydrocarbons.

DETAILED DESCRIPTION OF THE PREFERRED EMBODIMENTS

The overall process is more fully appreciated from the FIG. 1. In brief description, the drawing shows the invention applied to a circulating stream of liquid metal heat exchange fluid. The FIGURE shows a simplified schematic. This schematic arrangement does not show valves, instrumentation, heat exchangers and other equipment that those skilled in the art will readily recognize as necessary for process control and promoting process efficiency.

The FIGURE shows a main circulation loop for a liquid sodium heat exchange fluid. Looking then in detail at the normal operation of the loop, a sodium pump 10 discharges liquid sodium through a line 12 into a sodium heater 14 that delivers heated sodium to a line 16. Line 16 delivers the heated sodium to a process reactor 18 containing a plurality of plate elements (not shown) that define alternate heat exchange and process reaction channels. The liquid sodium heats the process channels to maintain a desired temperature for the reaction that takes place therein. Relatively cool liquid sodium exits the reaction channels through a line 20 and returns to the sodium pump 10.

A line 22 withdraws a slip stream of the liquid sodium from the discharge side of pump 10 for passage through a purification zone 24. Purification zone 24 removes impurities that accumulate in the circulating liquid sodium stream during the normal operation of the process. Such impurities may result from permeation of hydrogen through the reaction zone 18. Other impurities may accumulate over time in the system from minor leakage into the circulation loop through equipment such as pumps and instruments. The purification zone 24 may contain a contacting vessel and/or traps, for filtration or chemical sorption, to treat the slip stream. A line 26 returns purified sodium to the suction side of sodium pump 10 for continued circulation through the system. The flowing volume of the slip stream will normally comprise less than 30% and more normally less than 20% of the total circulating stream. As shown by the previously mentioned prior art those skilled in the art know generally how to design a variety of cold traps and contacting vessels for purification zone 24. With this invention the purification zone 24 need not have the capacity to accommodate the initial dirt burden of startup.

Looking then at startup and shutdown, a drain tank 30 supplies the inventory of liquid sodium to the sodium circulation loop when the process begins startup and collects liquid sodium from the sodium circulation loop when the process is shutdown. The drain tank contains appropriate heating elements to maintain the sodium in a liquid state during delivery and collection.

Initial startup of this system begins by displacing liquid sodium from tank 30 with a suitable displacement gas such as argon through an inlet pipe 32. Addition of the displacement gas pushes liquid sodium out of tank 30 and into the inlet of a dip pipe 34, though a line 38, across an open control valve 36, and into line 16. Suitable vents may be provided in the circulation loop as the liquid sodium displaces the air or other gases that may have occupied the empty circulation system. After filling of the circulation system, valve 36 closes to isolate drain tank 30 from the remainder of the circulation system.

Upon initial filling of the circulation system, the liquid sodium circulates through the circulation loop. Sodium heater 14 can maintain the liquid sodium at a desired temperature for removing oxides from the various metal surfaces in the heat exchange loop and heat exchange elements. During this time, there is usually no circulation of other process streams in reactor 18. After circulation of liquid sodium for about 8 hours at a temperature of about 400° C., the oxide layer is essentially removed from the heat exchange and piping surfaces.

Liquid sodium, now containing a heavy loading of oxides from the resulting oxidation of the sodium, drains back to line 38 across open valve 36 and into tank 30. As the liquid sodium drains back into tank 30, it contacts a scavenging material 40 that rests on the bottom of drain tank 30. Inflow of the liquid sodium displaces the argon gas which exits the tank 30 through a vent line 42 and a vapor trap 44 for catching sodium vapors. As the liquid sodium drains from the sodium circulation loop, an inert purge gas may be added at appropriate points (not shown) to fill the area occupied by the liquid sodium and to prevent air from being drawn into the system through any minor leakage paths. The level of liquid sodium in the drain tank 30 is monitored by a level gage 46. The location of dip line 34 directs the entering liquid sodium into direct contact with the oxygen scavenging material for intimate contacting of the stream with the scavenging material. The reduction of oxides and the scavenging of essentially all of the oxygen from the entering sodium stream takes place rapidly. The liquid sodium will ordinarily have a residence time of 4 hours in the tank which will be maintained at a temperature of about 200° C. during this time period.

The circulating heat exchange system is put into operation by, again, displacing the liquid sodium from the drain tank 30 by addition of a displacement gas through line 32. Having the inlet for line 34 located close to the oxygen scavenging material again promotes intimate contacting of the liquid sodium with the scavenging material before it reenters the sodium circulation loop via line 38 and open valve 36. Once the circulation loop has been filled and vented valve 36 is again closed and forced circulation of the liquid sodium begins while it is brought up to temperature by sodium heater 14 for the requirements of reactor 18.

What is claimed is:

1. A method for the startup purification of a circulating heat exchange stream comprising a liquid metal heat exchange fluid, the method comprising:

charging a heat transfer fluid comprising a liquid metal into initial contact with the metallic surfaces defining a fluid circulation volume for indirect heat exchange wherein at least a portion of the surfaces have been exposed to potential oxidation conditions;

passing the heat transfer fluid at suitable conditions to remove oxides from the metallic surfaces and introduce oxides into the liquid metal;

draining at least a portion of the liquid metal into a drain tank for the retention of the liquid metal;

contacting the liquid metal in the drain tank with an oxygen scavenging material at suitable conditions to reduce the concentration of the oxides in the liquid metal that entered the drain tank; and returning liquid metal having a reduced oxide concentration from the drain tank to the circulation volume.

2. The method of claim 1 wherein the circulation volume includes heat transfer surfaces defined by flat plates.

3. The method of claim 1 wherein the liquid metal comprises sodium.

4. The method of claim 1 wherein the drain tank retains the entire inventory of liquid metal from the circulation volume.

5. The method of claim 1 wherein the liquid metal is raised to a temperature of at least 400° C. before entering the drain tank and resides in the circulation volume for at least 4 hours before draining into the drain tank.

6. The method of claim 1 wherein the oxygen scavenging material comprises a zirconium gauze or mesh retained in the drain tank.

7. The method of claim 1 wherein the oxygen scavenging material comprises calcium dispersed on a alumina substrate.

8. The method of claim 7 wherein the drain tank is maintained at temperature in the range of from 200° C. to 400° C. for at least 4 hours while retaining the liquid metal.

9. A system for the circulation of a liquid metal heat exchange stream and providing purification of the heat exchange stream after startup, said system comprising:

a circulation volume defined at least in part by heat exchange surfaces and conduits for circulating a liquid metal between heat addition and heat removal locations;

a drain tank in communication with the circulation volume and sized to retain the entire inventory of liquid metal from the circulation volume; and, an oxygen scavenging material retained in the drain tank for contacting the liquid metal and chemically absorbing oxygen from the liquid metal.

10. The system of claim 9 wherein the oxygen scavenging material comprises a zirconium gauze or mesh retained in the drain tank.

11. The system of claim 9 wherein the oxygen scavenging material comprises calcium dispersed on a alumina substrate that fills a lower portion of the tank.

* * * * *